United States Patent [19]

Johansson et al.

[11] 4,275,489
[45] Jun. 30, 1981

[54] PIPE CLAMP STRUCTURES

[75] Inventors: Jan O. Johansson; Gösta Karlsson, both of Anderstorp, Sweden

[73] Assignee: Anderstorps Werkstads Aktiebolag, Sweden

[21] Appl. No.: 57,820

[22] Filed: Jul. 16, 1979

[30] Foreign Application Priority Data

Jul. 17, 1978 [SE] Sweden ................ 7807874

[51] Int. Cl.³ .............................................. B62D 1/18
[52] U.S. Cl. ................................................... 24/279
[58] Field of Search ................ 24/279, 280, 281, 282, 24/275, 276, 271; 285/382.2, 420, 424, 253; 248/74 R, 74 B

[56] References Cited

U.S. PATENT DOCUMENTS

| 366,532 | 7/1887 | Tuerk, Jr. ........................... 24/279 |
| 2,931,853 | 4/1960 | Wilson ........................... 248/74 R X |
| 3,741,032 | 6/1973 | Baker ........................... 24/279 X |

FOREIGN PATENT DOCUMENTS 173828 12/1960 Sweden ........................ 24/279
268571 4/1921 United Kingdom .................... 24/279

Primary Examiner—Roy D. Frazier
Assistant Examiner—Peter A. Aschenbrenner
Attorney, Agent, or Firm—Holman & Stern

[57] ABSTRACT

The invention is a tube clamp which is used to connect a first pipe to another pipe. The invention can be used, for example, to add a pipe extension to the exhaust pipe used on a car. The tube clamp is made from a plate having a first and second flat portion, each having a hole wherein said holes are equal. The holes are connected by a slot and the plate has first and second flanges surrounding and remote from the hole in the first and second portions of the plate. The plate is transversely bent between the first and second flat portion to a degree to form a connector passage, the plate being bent so that the first and second flat portions are in contact with each other and said holes are substantially coaxial with the first and second flanges directed away from each other. Connector means selected from the group of rivets or welds connects the first and second flat portions. A connector means going through a connector passage connects the pipe flange.

1 Claim, 5 Drawing Figures

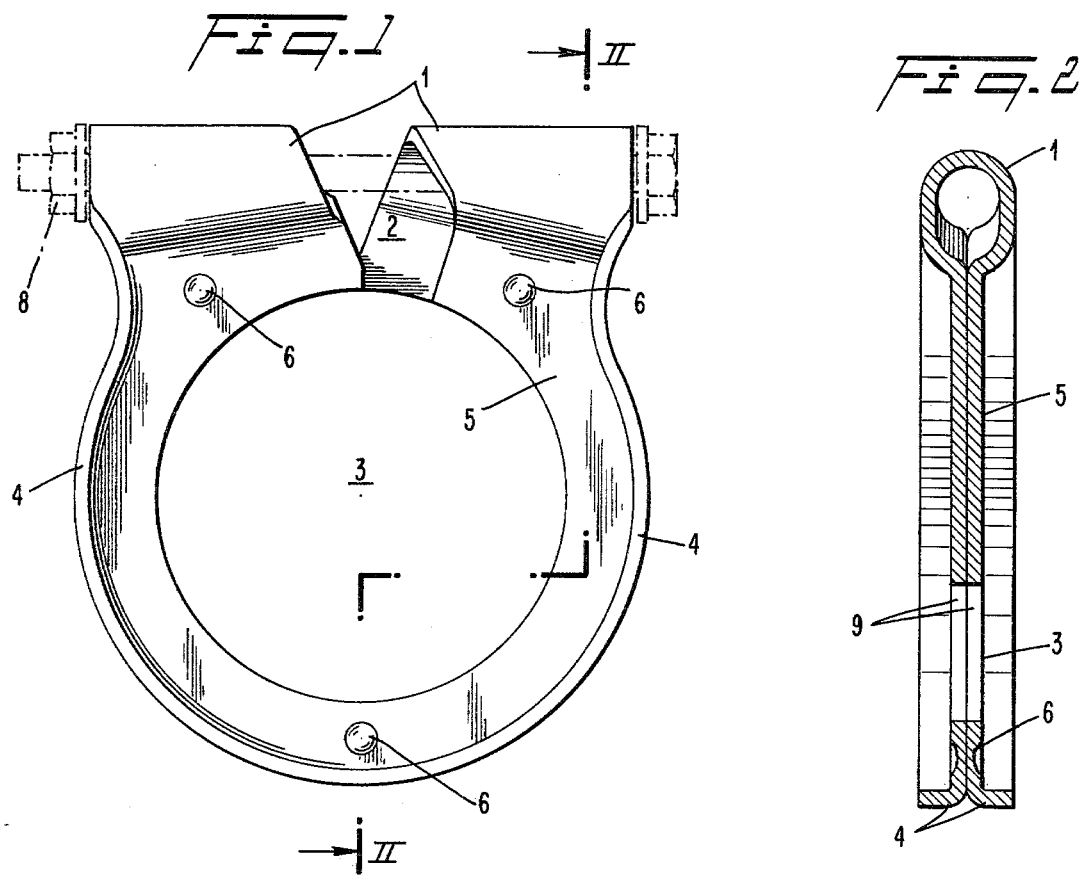
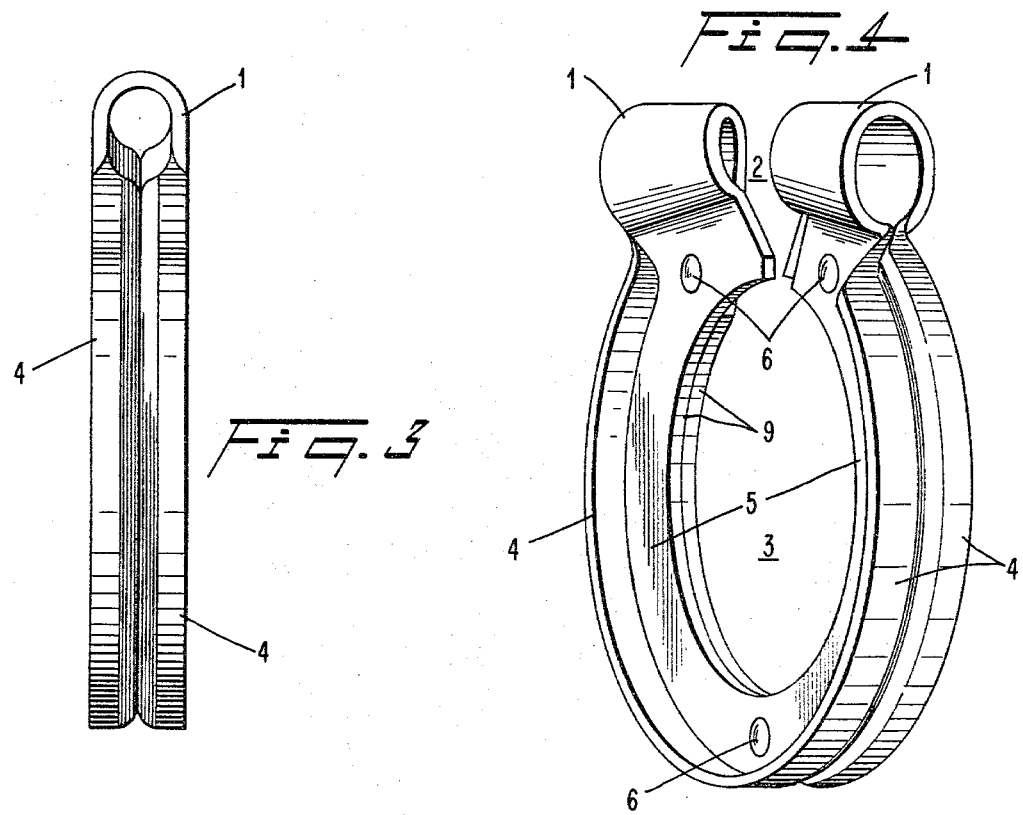

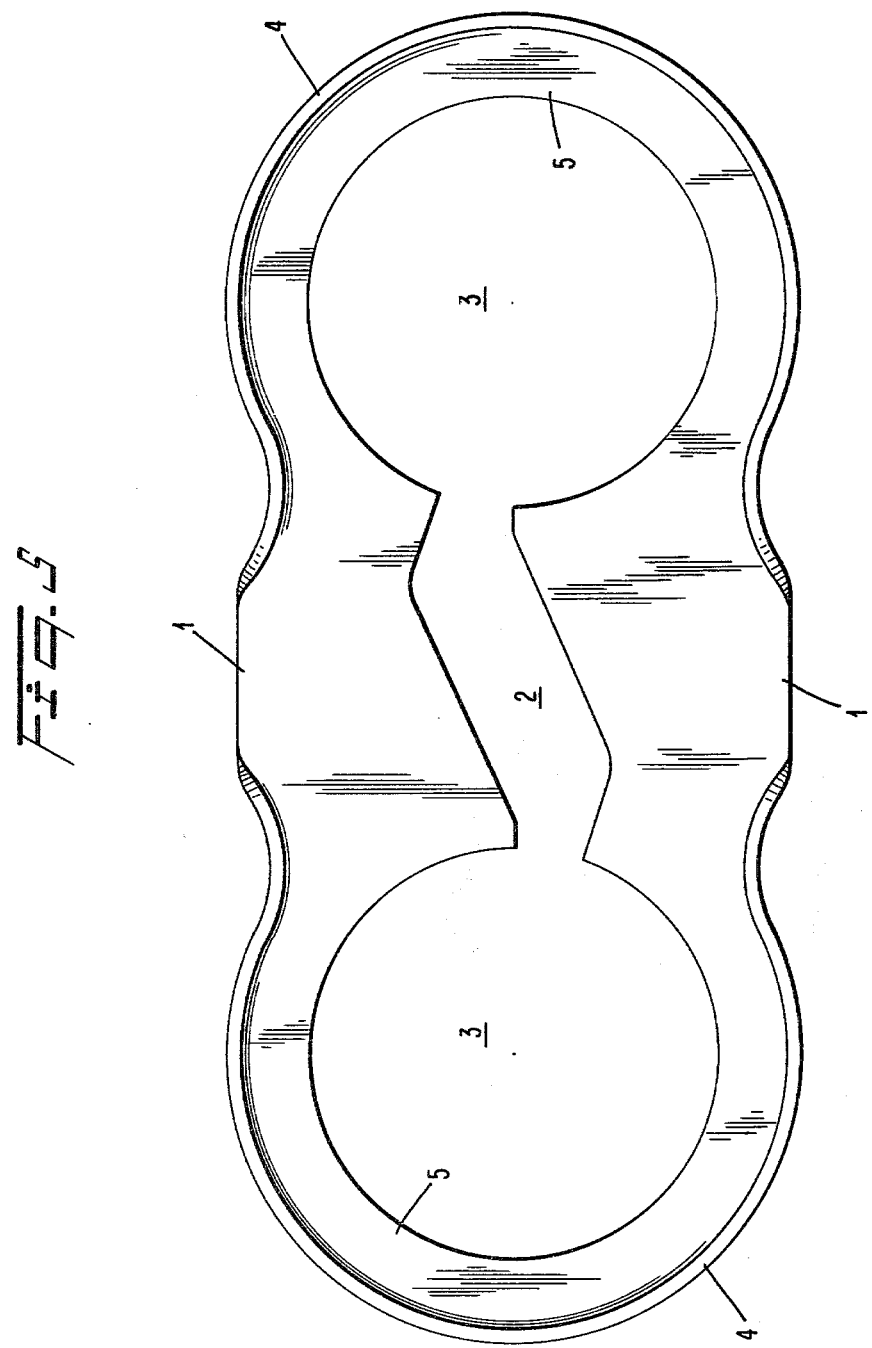

PIPE CLAMP STRUCTURES

This invention relates to those tube clamps, which are made by a crosswise bending of a longish plate provided with two mutually equal and preferably circular holes, which after the bending of the plate are mutually parallel to and situated opposite each other, at which in the central part of the plate there is a slot connecting the holes and having its edges apart from each other. Such tube clamps are shown and described in the Swedish patent specification No. 173 828.

In motor cars one started to use more heavier exhaust pipes, which have to be lengthened so, that a somewhat heavier tube is passed outside a somewhat weaker tube without a preceding slottening. For a safe holding of the end parts of the tubes to each other and to obtain a seal in the tube joint one can squeeze the outer tube against the inner one by means of a suitable tube clamp.

A purpose of the invention is to bring about a tube clamp giving a relatively strong squeezing effect to the exterior tube, so in spite of being without slots the exterior tube will be squeezed intimately to the inner tube and this will be obtained by giving the tube clamp a narrow action surface to the exterior tube.

The invention, the characteristics of which is evident from the following claims, will be described more in detail in connection with the attached drawings, where FIG. 1 is a side view of a tube clamp according to the invention, FIG. 2 is a sectional view along the line II—II in FIG. 1, FIG. 3 is an edge view and FIG. 4 is a perspective view of the tube clamp, and FIG. 5 shows a blank for a tube clamp.

The blank for a tube clamp as shown in the FIG. 5 consists of a longish plate 1 provided with two equal circular holes 3 connected by a slot 2. The outer edges of the parts 5 of the plate, which surround the holes, are jolted up to edge flanges 4, and after the bending of the plate to a tube clamp as shown in the FIGS. 1 to 4, said edge flanges are directed from each other and having said parts 5 of the plate contacting each other. Further, said parts can be attached to each other by rivets, point welds 6 or similar. The tube clamp can be squeezed about a tube joint, not shown, by means of a bolt 7 with a nut 8, in FIG. 1 shown with dash lines.

The tube clamp as shown will act on a tube joint along the narrow surface as the edges 9 of the holes will offer, which corresponds to the double thickness of the plate, for which reason the surface pressure will be high and by that the squeezing action on the tube clamp, simultaneously as the tube clamp will be steadied by the edge flanges on the outer edges of the tube clamp as directed from each other and the tube clamp will allow a particularly effective tightening of the bolts 7 nut 8.

What we claim is:

1. A tube clamp comprising: a plate having a first and second flat portions, each having a hole, said holes being equal in diameter, wherein said holes are connected by a slot in said plate having a first and second flange portion surrounding and remote from each of said hole in said first and second flat portions, said plate being transversely bent between said first and second flat portion to create a connector passage, wherein said first and second flat portions are in contact with each other and said holes are substantially coaxial and said first and second flanges are directed away from each other; a means to connect said bent first and second flat portion selected from the group of welds or rivets; and a connector means going through said connector passage.

* * * * *